United States Patent [19]

Allen

[11] Patent Number: 4,479,985

[45] Date of Patent: Oct. 30, 1984

[54] METHOD FOR CLEANING AND CLEARING PLASTIC SURFACES

[76] Inventor: Jefferson K. Allen, 10 Hall Ave., Nashua, N.H. 03060

[21] Appl. No.: 331,489

[22] Filed: Dec. 17, 1981

Related U.S. Application Data

[63] Continuation of Ser. No. 973,400, Dec. 26, 1978, abandoned.

[51] Int. Cl.$^3$ .............................................. B05D 5/06
[52] U.S. Cl. ................................... 427/164; 427/322; 427/443; 428/423.1; 428/515; 428/519; 428/520
[58] Field of Search ............... 427/164, 140, 322, 443; 428/483, 497, 423, 500, 515, 521, 522, 520, 519; 264/341; 106/13, 264; 252/DIG. 10; 134/4, 42; 523/518, 500

[56] References Cited

U.S. PATENT DOCUMENTS

| | | |
|---|---|---|
| 1,643,251 | 9/1927 | McBride ..................... 252/DIG. 10 |
| 1,764,392 | 6/1930 | Diebold ..................... 252/DIG. 10 |
| 1,875,552 | 9/1932 | Bateman ................... 134/42 |
| 2,713,039 | 7/1955 | Cadwell et al. ..................... 106/264 |
| 2,862,898 | 12/1958 | Chapin ................................. 106/264 |
| 2,967,163 | 1/1961 | Fain et al. ............................ 523/518 |
| 2,986,543 | 5/1961 | Daniel ................................... 523/518 |
| 3,382,294 | 5/1968 | Christenson et al. ................ 523/500 |
| 3,501,425 | 3/1970 | Delius ................................... 523/518 |
| 3,515,579 | 6/1970 | Shepherd et al. ..................... 106/13 |
| 3,677,821 | 7/1972 | Tanaka ..................... 252/DIG. 10 |
| 3,876,575 | 4/1975 | Hayashi et al. ..................... 427/137 |
| 3,904,732 | 9/1975 | Wick et al. ............................ 106/13 |

Primary Examiner—Sadie L. Childs
Attorney, Agent, or Firm—Thompson, Birch, Gauthier & Samuels

[57] ABSTRACT

Clouded acrylate surfaces are cleaned permanently. The clouded surface is first cleaned using a petroleum distillate. Subsequently, a coating of an oil-monomer modified alkyl resin, 71-78% non-volatile, is coated on the surface to prevent further clouding.

7 Claims, No Drawings

METHOD FOR CLEANING AND CLEARING PLASTIC SURFACES

This application is a continuation of application Ser. No. 973,400, filed Dec. 26, 1978 now abandoned.

BACKGROUND AND BRIEF SUMMARY OF THE INVENTION

This invention relates to a method and composition for cleaning and preserving in a clear condition transparent plastic sheets for example, windows, such as "PLEXIGLAS".

U.S. Pat. Nos. 3,904,732 and 3,677,821 are broadly directed to restoring the surfaces of plastic sheets such as "LUCITE" and "PLEXIGLAS", polymethylmethacrylates.

My invention is more particularly directed to overcoming the problems associated with so-called plastic or synthetic transparent windows such as those windows formulated primarily or entirely from methylmethacrylate.

These windows after a period of time tend to cloud or become less transparent and therefore more opaque. In the cleaning of these windows with the use of commercial cleaners, two problems have been encountered: first, most commercial cleaners, such as are available to consumers at the retail level, will not remove the cloudiness or opaqueness from these windows; second, those few commercial cleaners available that will, in fact, clear the windows, such as "LESTOIL" ®, a product of Noxell Corporation of Baltimore, Md., will only temporarily restore the transparency.

I have overcome the aforementioned problems of the inability to clean and maintain such windows in a clear or transparent condition by using a two-step process to clear permanently such windows. If the windows are initially clear, then only one of the two steps of my process and formulation is required.

Broadly, my invention comprises cleaning a surface of a transparent methylmethacrylate (a thermoplastic poly-type polymer more specifically an acrylic monomer). Where the acrylic surface is clouded, the first step comprises cleaning the surface to remove the opacity and subsequently coating the cleaned surface to prevent further clouding.

In the first step it has been found that a composition of a petroleum distillate emulsified in water is suitable. The petroleum distillate is a mixture of hydrocarbons having a boiling point between 150°–190° C.; that is, the fraction in the distillation of petroleum between gasoline and the fuel oils as determined in accordance with Standard Method of Tests for Distillation of Gasoline, Naptha, Kerosene and Similar Petroleum Products (ASTM D 86). The petroleum products found in this range are typically referred to as kerosene, coal oil, astrol oil or, more broadly, paraffinic mixtures of hydrocarbons as identified by their boiling point ranges. These paraffinic hydrocarbons may be applied directly in the cleaning step or may be emulsified with water of up to one part hydrocarbon to nine parts water by volume. Alternatively a pine oil-alcohol-water composition may be used such as Pine-Sol a product of American Cyanamid.

In the second step of the process, a coating composition is applied. The coating composition forms a film which permanently adheres to the surface and prevents further clouding. Also, it has been found that the formulations per se will clean the surface but not to the same degree of clearness (clarity) as the combination of both steps. Broadly, the coating composition comprises a polyester resin, such as an alkyd resin. The alkyd resin is modified with an oil such as linseed, safflower, tung, and soy bean, and is further modified or copolymerized with monomers such as urethane, vinyl toluene, acrylic and/or vinyl monomers. The resin is dissolved in a solvent such as petroleum distillates having a boiling point range of between 150° to 190° C. such as mineral spirits and optionally dryers are added which would be compatible with the formulation. The dryers are any compatible oxidant which hastens the drying of the composition, such as a solution of lead, manganese or zinc salts of resin acids.

DESCRIPTION OF THE PREFERRED EMBODIMENT

My invention will be described in reference to the cleaning and coating of surfaces of transparent acrylic windows, or sheets, the surfaces of which have become cloudy due to exposure to the sun.

A transparent acrylic sheet as commercially available is sold under the trademarks LUCITE or PLEXIGLAS, both well-known polymethylmethacrylates and products of DuPont and Rohm & Hass, respectively.

The surfaces of such sheets after a period of time, as is well known, tend to cloud or become opaque rendering the window less transparent. In order to clean permanently the sheet the following steps are effected.

In the following Examples the cleaning step to clear the surfaces was accomplished as follows. An aqueous emulsion of a petroleum distillate was used. The petroleum distillate used is available commercially as kerosene. When emulsified in water, it is commercially sold under the trademark LESTOIL. The cleaning solution was applied to the clouded surface by rubbing the mixture on the clouded surface, preferably using a circular motion. After rubbing for a predetermined time, between about 10 seconds to 1 minute, for example 30 seconds the surface was cleared and was subsequently wiped dry. At this point, the surface appeared to be transparent but the surface reclouded within an hour or more. Generally the clouded surface is the surface exposed directly to the sunlight. Depending upon the location and use of the sheet only one surface or both surfaces may have to be cleaned and coated.

In the following Examples, the coating was applied by spraying it with a commercial sprayer preferably starting at the top of the sheet with the window standing in an upright position and allowing the material to drain down. The coating was continuously applied until no ripples appear and a uniform film is formed. The coating was then is allowed to air dry.

The coating is a hard clear gloss coating with excellent adhesion, abrasion resistance, good weathering, excellent chemical resistance and flexibility. The oil modified-alkyd resins are combined with a monomer, for example, stryene, urethane, vinyl toluene, or acrylic monomers. Urethane alkyd is preferred.

For the cleaning solution, the commercial formulation of LESTOIL was used with varying amounts of water. More specifically, in parts by volume, LESTOIL/water the following ratios were found satisfactory: 1:0.5; 1:1; 1:2 and 1:3 to completely clear the surface.

Alternatively for the cleaning solution, PINE SOL having the formulation; Pine oil 30.0%; isopropanol 10.9%; soap 10%; and water 49.1% was used.

EXAMPLE I $U_2$ polyurethane-Clear Gloss as manufactured by Sterling Clark Lurton Corporation, Malden, Mass., having the formulation by weight percent linseed alkyd modified with toluene diisocyanate, 45% and mineral spirits and dryers 55% was used. To 32 fluid ozs. of this commercial coating was added 16 fluid ozs. of mineral spirits and 1 fluid oz. of dryers. The final formulation was applied to the cleaned surface before reclouding commenced, e.g., within 10 to 20 minutes. Three months after coating, the window remained transparent.

EXAMPLE II

A Polyurethane Varnish 012 Gloss Spar as manufactured by General Paint and Chemical Company, Division of Cotter & Company, Chicago, Ill., having the formulation by weight percent, non-volatile 41% (toluene dissocyanate soya copolymer), volatile 59% (mineral spirits 99%, dryers 1%) was used. To 32 fluid ozs. of this commercial coating as in Example I, was added 16 fluid ozs. of mineral spirits and 1 fluid oz. of dryers. A cleaned surface was coated with formulation before reclouding commenced. After three months the window was still transparent.

EXAMPLE III 70-28 (568) Semi-Gloss as manufactured by Dutchboy Paints, West Caldwell, N.J., having the formulation by weight percent, non-volatile (vinyl alkyd copolymer) 33.7% and volatile (mineral spirits) 66.3% was used. To 32 fluid ozs. of this commercial coating was added 16 fluid ozs of mineral spirits and 1.0 fluid oz. of dryers. A cleared surface was coated with this formulation. After three months the window was still transparent.

For all surfaces cleaned but not coated re-clouding commenced within one hour.

Although 16 fluid ozs. of mineral spirits was used, any solvent such as mineral spirits which would be a volatile component compatible with the formulation, may be used. Where mineral spirits are used having a bulking value of 6.50 lbs. per gallon the percent volatile by weight in the final formulation based on the addition of 12-20 fluid ozs. will range between about 71 to 78%. This is based on the additional between 12 and 20 fluid ozs. of solvent, such as mineral spirits to the commercially available formulations described above. The dryers may be added optionally, as desired.

Depending on the degree of clouding the formulations may be used alone to both clean and coat the surfaces.

Having described my invention what I now claim is:

1. A method for cleaning and preventing clouding of transparent methylmethacrylate sheets which includes:
   coating the surface of the sheet with a formulation which consists essentially of a non-volatile oil-monomer modified alkyd resin, the monomer selected from the group consisting of styrene, vinyl toluene, urethane and acrylic monomers; and a volatile solvent, the solvent being a petroleum distillate having a boiling point range between 150°-190° C., the non-volatile resin comprising 22-29% by weight of the formulation and the volume volatile solvent comprising 78-71% by weight of the formulation to form a clear film which prevents clouding of the acrylate sheet.

2. The method of claim 1 wherein the oil is selected from the group consisting of linseed, safflower, tung and soybean oils.

3. The method of claim 1 wherein the resin is linseed alkyd modified with toluene diisocyante.

4. The method of claim 1 wherein the resin is soya alkyd modified with toluene diisocyante.

5. The method of claim 1 wherein the resin is modified with a vinyl alkyd copolymer.

6. The method of claims 1, 2, 3, 4 or 5 which includes:
   cleaning the acrylate surface with a petroleum distillate having a boiling point range of between 150°-180° prior to coating the surface.

7. The method of claims 1, 2, 3, 4 or 5 which includes:
   cleaning the acrylate surface with a pine oil-alcohol-water formulation.

* * * * *